United States Patent
Hirayama et al.

[11] Patent Number: 5,965,051
[45] Date of Patent: Oct. 12, 1999

[54] CERAMIC HEATING ELEMENT MADE OF MOLYBDENUM DISILICIDE AND SILICON CARBIDE WHISKERS

[75] Inventors: Noritomo Hirayama; Nobuhisa Kato; Mutsumi Nagumo; Masahiro Uno, all of Kawasaki; Yohichi Yamashita, Urawa, all of Japan; Wan Jiang, Dalan, China; Tetsuo Uchiyama; Kenichi Tsuji, both of Kumagaya, Japan

[73] Assignees: Fuji Electric Co., Ltd., Kanagawa; Kabushiki Kaisha Riken, Tokyo, both of Japan

[21] Appl. No.: 08/589,155

[22] Filed: Jan. 22, 1996

[30] Foreign Application Priority Data

Jan. 24, 1995 [JP] Japan .................................. 7-008581

[51] Int. Cl.⁶ ...................................................... H05B 3/10
[52] U.S. Cl. ............................................ 219/553; 219/552
[58] Field of Search ...................... 219/541, 553, 219/552, 270; 252/516; 501/88, 91–93; 392/407, 416; 264/65

[56] References Cited

U.S. PATENT DOCUMENTS

| | | | |
|---|---|---|---|
| 3,969,696 | 7/1976 | Wolfe et al. | 338/315 |
| 4,205,363 | 5/1980 | Boos et al. | 361/264 |
| 4,433,233 | 2/1984 | Hierholzer, Jr. et al. | 219/553 |
| 4,443,361 | 4/1984 | Hierholzer, Jr. et al. | 252/516 |
| 4,555,358 | 11/1985 | Matsushita et al. | 252/516 |
| 4,749,667 | 6/1988 | Jun et al. | 501/89 |
| 4,774,396 | 9/1988 | Salit et al. | 219/553 |
| 4,927,792 | 5/1990 | Petrovic et al. | 501/92 |
| 5,000,896 | 3/1991 | Petrovic et al. | 501/92 |
| 5,006,290 | 4/1991 | Hida | 501/89 |
| 5,043,118 | 8/1991 | Kim et al. | 264/641 |
| 5,063,182 | 11/1991 | Petrovic et al. | 501/96 |
| 5,069,841 | 12/1991 | Petrovic et al. | 501/92 |
| 5,084,606 | 1/1992 | Bailey et al. | 219/270 |
| 5,085,804 | 2/1992 | Washburn | 252/516 |
| 5,130,055 | 7/1992 | Yasutomi et al. | |
| 5,292,692 | 3/1994 | Maloney et al. | 501/92 |
| 5,308,806 | 5/1994 | Maloney et al. | 501/92 |
| 5,340,531 | 8/1994 | Jayashankar et al. | 418/10 |
| 5,382,553 | 1/1995 | Petrovic | 501/92 |
| 5,470,506 | 11/1995 | Tanigami et al. | 252/518 |
| 5,640,666 | 6/1997 | Jayashankar et al. | 501/92 |

FOREIGN PATENT DOCUMENTS

| | | | |
|---|---|---|---|
| 486009 | 5/1992 | European Pat. Off. | 219/270 |
| 44 20 944 | 1/1996 | Germany . | |
| 60-195061 | 10/1985 | Japan . | |
| 1-115876 | 5/1989 | Japan . | |
| 3-116676 | 5/1991 | Japan . | |
| 3-145084 | 6/1991 | Japan . | |
| 3-149791 | 6/1991 | Japan | 219/541 |
| 4-94083 | 3/1992 | Japan . | |
| 8-48563 | 2/1996 | Japan . | |

OTHER PUBLICATIONS

Vasudevan, A.K. et al, "A Comparative Overview of Molybdenum Disilicide Composites", Materials Science and Engineering, A155 (1992), pp. 1–17.

*Primary Examiner*—Teresa Walberg
*Assistant Examiner*—Krishan Pasrija
*Attorney, Agent, or Firm*—Venable; Robert J. Frank; Allen Wood

[57] ABSTRACT

A ceramic heating element includes a heat-generating portion 1 formed of a ceramic composite material with 3 to 40 vol. % of silicon carbide (SiC) whiskers and the balance substantially of molybdenum disilicide ($MoSi_2$), and electrode portions 2a and 2b provided on both ends of the heat-generating portion 1.

30 Claims, 2 Drawing Sheets

CERAMIC HEATING ELEMENT MADE OF MOLYBDENUM DISILICIDE AND SILICON CARBIDE WHISKERS

BACKGROUND OF THE INVENTION

1. Field of the Invention

This invention relates to a ceramic heating element to be used as a heating element in an infrared ray source as well as an electric furnace.

2. Description of Related Art

A ceramic resistance heating element as disclosed in Japanese Patent Application Laid-Open No. 296,833/1993 is shown as a conventional example in FIG. 1.

In FIG. 1, a ceramic heating element 10 is produced, for example, by extrusion of molybdenum disilicide prepared using water as a binder, winding up the resulting molybdenum disilicide of small diameter in a coiled form, drying it, and firing it in a vacuum furnace to form a heating element. Lead wires 12a and 12b are connected to both ends of the coiled ceramic wire (heating element) 10. When electricity flows through the coiled ceramic wire 10 via the lead wires 12a and 12b, the coiled ceramic wire 10 generates heat.

The coiled ceramic wire 10 is disposed in a heat resistant ceramic (e.g., alumina) tube 16 provided with an infrared ray irradiation window 14. The joints between the ceramic wire 10 and the lead wires 12a and 12b are fixed in the ceramic tube 16 by means of a heat-resistant adhesive 18a and 18b. Accordingly, when electricity flows through the coiled ceramic wire 10 via the lead wires 12a and 12b, infrared rays emanated from the coiled ceramic wire 10 come out via the irradiation window 14.

Meanwhile, $MoSi_2$ is utilized in the form of a heating element for use in a high-temperature furnace (e.g., at 1,750° C.) in the air since it exhibits an excellent oxidation resistance by virtue of its capability of forming a protective film of silicon dioxide. Accordingly, $MoSi_2$ has attracted attention as a high temperature structural material for use in a gas turbine member and the likes and has been evaluated as such a material.

Since $MoSi_2$ involves problems of brittleness at low temperatures and low strength at high temperatures, however, a difficulty has been experienced in materializing therefrom a heating element. Further, since the resistivity of $MoSi_2$ as a property of the material is as low as 0.0003 ($\Omega cm$), a large amount of electric current is necessary for heat build-up of $MoSi_2$ to a high temperature (1,300° C.). This involves the problem of increased electric power consumption. Furthermore, the large amount of electric current to heat the $MoSi_2$ to a high temperature develops an electromagnetic force. Attractive and repulsive forces developed by the electromagnetic force as well as thermal stress developed by the heat build-up act on the heat-generating portion of the heating element, so that creep deformation may occur leading to rupture thereof. Thus, the heating element made of $MoSi_2$ involves the drawback of a short life span.

As for electric power consumption, various methods of increasing the apparent value of resistance of $MoSi_2$ have been proposed, a representative one of which is a method wherein a small-diameter wire is formed from $MoSi_2$.

Since a general method of producing an $MOSi_2$ heating element comprises firing of an $MoSi_2$ powder, however, not only formation therefrom of a small-diameter wire but also miniaturization of the heating element are out of the bounds of possibility. A primary cause of this is that the firing method itself is not suitable for formation of a small-diameter wire. Accordingly, even when formation of a small-diameter wire is attempted, the diameter of the resulting wire becomes large to some extent whereby a high value of resistance thereof cannot be secured, thus requiring a large amount of electric current.

Even if mechanical working of an $MoSi_2$ wire is effected after firing thereof, the ceramic is so brittle in itself that the wire cannot be worked to such a small diameter as to be usable as a light source. Thus, it has been considered very difficult to develop a high-temperature $MoSi_2$ heating element usable as an infrared ray source element at a temperature of at least 1,000° C.

An invention according to which molybdenum disilicide is combined with a second phase of a boride in order to improve the toughness and high-temperature strength of molybdenum disilicide for use as a high-temperature structural material or as a heating element is disclosed in Japanese Patent Application-Laid-Open No. 195,061/1985. Another invention according to which molybdenum disilicide is combined with a second phase of molybdenum and tungsten boride in order to endow molybdenum disilicide with a sufficient oxidation resistance even at a temperature of at least 1,600 ° C. in addition to improve mechanical properties is disclosed in Japanese Patent Application Laid-Open No. 115,876/1989.

However, the ceramic composite materials according to the above-mentioned inventions cannot be said to be satisfactory for use as an high temperature infrared ray source element as mentioned above.

SUMMARY OF THE INVENTION

An object of the present invention is to provide a ceramic heating element which is endowed with a high-temperature strength by making much of the excellent creep resistance of $MoSi_2$ resulting in a heating element that can miniaturized is size with a decrease in electric power consumption and lengthened in life span.

In accordance with the present invention, there is provided a ceramic heating element comprising a heat generating portion constituted of a ceramic composite material and electrode portions provided on both ends of the heat-generating portion, wherein the ceramic composite material comprises 3 to 40 vol. % of SiC whiskers and the balance of a matrix substantially of $MoSi_2$.

According to the present invention, a miniature long-life ceramic heating element having excellent heat-generating properties, oxidation resistance and deformation resistance, and involving a small electric power consumption, can be obtained using molybdenum disilicide ($MoSi_2$) and silicon carbide (SiC) whiskers.

Further, joints with a very high reliability can be obtained because platinum wires can be fusion-bonded to a molybdenum disilicide ceramic composite and the melting point of the joints is as very high as 1,000° C.

The above and other objects, effects, features and advantages of the present invention will become more apparent from the following description of the embodiments thereof taken in conjunction with the accompanying drawings.

DETAILED DESCRIPTION OF PREFERRED EMBODIMENTS

When a molybdenum disilicide ceramic is mixed with SiC whiskers to form a molybdenum disilicide-based ceramic composite which is endowed with a high-temperature strength by making the most of the excellent creep resistance of the former, a heating element can be miniaturized while attaining a long life span thereof and a small electric power consumption thereof. The SiC whiskers, to be chosen with the viewpoint of enhancing the mechanical strength of the heating element, are SiC whiskers, having a high breaking strength in themselves, which are basically either in an α-crystal form or even in a β-crystal form with stacking faults in the direction of growth thereof. The average diameter and length of the whiskers may also be appropriately chosen with the viewpoint of improving the fracture toughness (toughness) of the heating element and in an aspect of the probability of internal defects thereof.

On the other hand, the matrix substantially of $MoSi_2$ (hereinafter referred to as the "$MoSi_2$-based matrix") may be combined with a reinforcing second phase or reinforcing second and third phases not degrading the properties of $MoSi_2$, examples of which include $Si_3N_4$, TiC, ZrC, HfC, TiB, $TiB_2$, $ZrB_2$, $HfB_2$, $ZrO_2$, $HfO_2$, SiC, MoB, $MO_2B$, $MO_2B_5$, WB, $W_2B$, $WB_2$ and $W_2O_5$ phases. Thus, the matrix can be reinforced.

EXAMPLES

Figure 1:
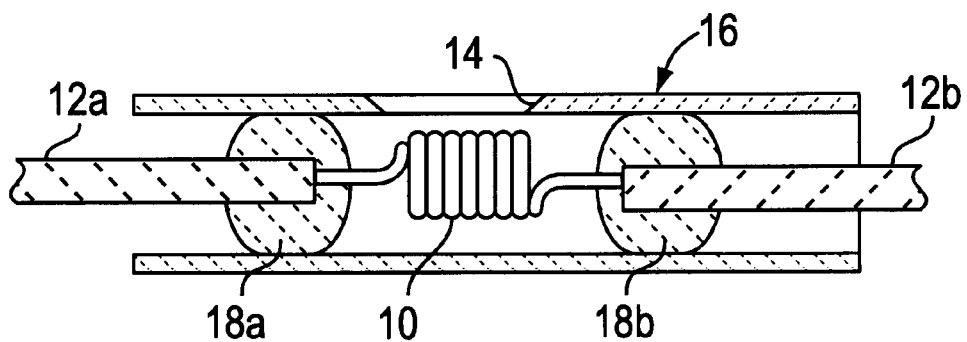
FIG. 1 is a constitutional diagram showing a conventional infrared ray irradiation apparatus.
Figure 2:
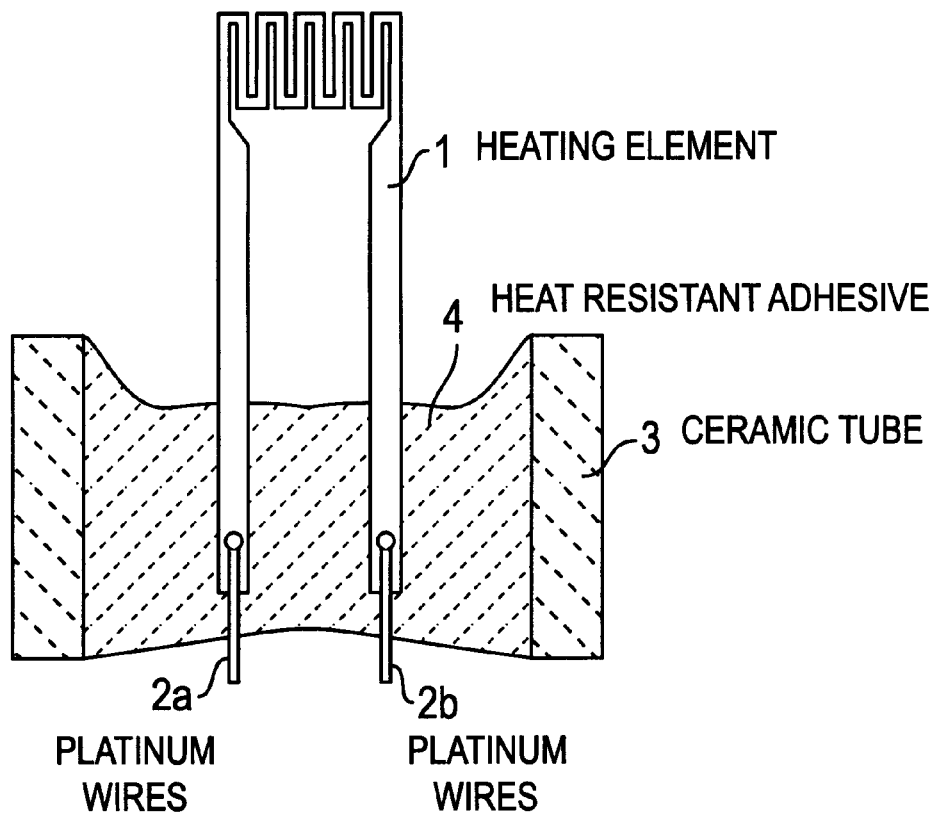
FIG. 2 is a constitutional diagram showing an example of the present invention.

FIG. 2 is a constitutional diagram showing an example of the present invention. In FIG. 2, reference numeral 1 denotes a serpentine (S-shaped) ceramic heating element made of a molybdenum disilicide ($MoSi_2$)-based ceramic composite reinforced with silicon carbide (SiC) whiskers. Platinum lead wires 2a and 2b are welded to both ends of the serpent like ceramic heating element 1 to form electrodes. The serpentine ceramic heating element 1 is fixed in a ceramic tube 3 made of, e.g., alumina, by means of a heat resistant adhesive 4. Accordingly, when electricity is caused to flow through the serpentine ceramic heating element 1 via the lead wires 2a and 2b, the serpentine ceramic heating element 1 generates heat to radiate infrared rays.

The starting materials of the serpentine ceramic heating element 1 to be used herein are (1) an $MoSi_2$ powder of at most 2 μm in average particle size, and (2) SiC whiskers of 0.2 to 1.0 μm in average diameter and 2 to 50 μm in average length, wherein SiC whiskers having either an α-crystal (hexagonal crystal) structure or a β-crystal (cubic crystal) structure with stacking faults in the direction of growth thereof, i.e., a β-crystal (cubic crystal) structure with an X-ray diffraction pattern having a peak at 2θ=33.6° but having no peak at 2θ=41.4°, account for at least 50% of all the whiskers. A mixed powder of the starting materials, i.e., the $MoSi_2$ powder and the SiC whiskers, is hot pressed under a pressure of 50 to 500 kg/cm² at a temperature of 1,400 to 1,850° C. for 10 minutes to 5 hours in order to make the resulting sintered ceramic composite as dense as possible. The sintered composite is ground into a thin disc, which is then formed into a serpentine shape, for example, by precision working means such as wire cutting.

Where a reinforcing second phase or reinforcing second and third phases not degrading the properties of $MoSi_2$, examples of which include $Si_3N_4$, TiC, ZrC, HfC, TiB, $TiB_2$, $ZrB_2$, $HfB_2$, $ZrO_2$, $HfO_2$, SiC, MoB, $MO_2B$, $Mo_2B_5$, WB, $W_2B$, $WB_2$ and $W_2O_5$ phases, are added to the $MoSi_2$-based matrix, the starting material powder(s) thereof is also at most 2 μm in average particle size.

When the average-diameter of the SiC whiskers is smaller than 0.2 μm, the toughness and strength of the resulting ceramic composite material are not sufficiently improved. On the other hand, when it exceeds 1.0 μm, the size of defects introduced into the resulting ceramic composite material becomes large to make it poor in strength. When the average length of the SiC whiskers is smaller than 2 μm, the whiskers cannot sufficiently improve the strength of the resulting ceramic composite material. On the other hand, when the average length of SiC whiskers exceeds 50 μm, the probability of introducing defects into the resulting sintered composite becomes high to lower the strength of the ceramic composite material. In the foregoing aspects, it is desirable to use SiC whiskers having an average-diameter of about 0.4 μm to about 0.9 μmm and an average length of about 10 μm to about 40 μm.

Further, it is desirable that SiC whiskers having either an α-crystal structure or a β-crystal structure with stacking faults in the direction of growth thereof, i.e., a β-crystal structure with an X-ray diffraction pattern having a peak at 2θ=33.6° but having no peak at 2θ=41.4°, account for at least 50% of all the SiC whiskers to be used herein. When the amount of the SiC whiskers having either an α-crystal structure or a β-crystal structure with an X-ray diffraction pattern having a peak at 2θ=33.6° but having no peak at 2θ41.4° is smaller than 50% based all the whiskers, improvements in the toughness and strength of the resulting ceramic composite material may not be recognized. By the same token, it is preferable to use SiC whiskers comprising at least 80%, of those having either an α-crystal structure or a β-crystal structure with an X-ray diffraction pattern having a peak at 2θ=33.6° but having no peak at 2θ=41.4°.

The $MoSi_2$-based matrix may be reinforced by combining with a reinforcing second phase or reinforcing second and third phases not degrading the properties of $MoSi_2$, examples of which include $Si_3N_4$, TiC, ZrC, HfC, TiB, $TiB_2$, $ZrB_2$, $HfB_2$, $ZrO_2$, $HfO_2$, SiC, MoB, $Mo_2B$, $Mo_2B_5$, WB, $W_2B$, $WB_2$ and $W_2B_5$ phases.

Additionally stated, the amount (vol. %) of the second or the second and third phases is desirably at most 30 vol. % based on the $MoSi_2$-based matrix.

The average particle size of the starting material powder of the matrix, i.e., $MoSi_2$ either alone or in mixture with one or two of $Si_3N_4$, TiC, ZrC, HfC, TiB, $TiB_2$, $ZrB_2$, $HfB_2$, $ZrO_2$, $HfO_2$, SiC, MoB, $Mo_2B$, $Mo_2B_5$, WB, $W_2B$ $WB_2$, $W_2B_5$, etc., is specified to be at most 2 μm from the viewpoint of obtaining a dense sintered composite. When a starting material powder having an average particle size larger than 2 μm is used, grain growth occurs before densification to make it poor in mechanical strength. As for $MoSi_2$ in particular, it is preferable to use a starting material powder of at most 1 μm in average particle size.

The respective amounts of the components to be blended together are as follows. When the total amount of an MoSi$_2$-based ceramic and SiC whiskers is 100 vol. %, 3% to 40 vol. % of the SiC whiskers are blended with the balance of the MoSi$_2$ based ceramic. When the amount of the SiC whiskers is smaller than 3 vol. %, the toughness and strength of the resulting ceramic composite material are not sufficiently improved. On the other hand, when the amount of the SiC whiskers exceeds 40 vol. %, defects are adversely introduced into the resulting sintered composite to lower the strength thereof.

A method of producing an MoSi$_2$-SiC whisker ceramic composite will now be described.

Predetermined amounts of MoSi$_2$ (containing one or two of Si$_3$N$_4$, TiC, ZrC, HfC, TiB, TiB$_2$, ZrB$_2$, HfB$_2$, ZrO$_2$, HfO$_2$, SiC, MoB, Mo$_2$B, Mo$_2$B$_5$, WB, W$_2$B, WB$_2$, W$_2$O$_5$, etc. in the case of combining with a second phase or second and third phases) and SiC whiskers as specified above as the starting materials are taken up and mixed together.

It is desirable to effect sufficient mixing (e.g., for at least 48 hours) with a ball mill or the like. When a starting material powder having an average particle size larger than 2 μm is used, the starting material powder may first be well pulverized with an attritor or the like, and then admixed with the SiC whiskers, followed by effecting mixing thereof with a ball mill or the like. The resulting mixed powder is dried, then placed in a mold having a desired shape, and then hot pressed at 1,400 to 1,850° C. for 10 minutes to 5 hours while applying thereto a pressure of 50 to 500 kg/cm$^2$.

When sintering is effected under a pressure lower than 50 kg/cm$^2$ the resulting sintered composite is not sufficiently dense and no improvement in the mechanical strength is secured. On the other hand, when sintering is effected under a pressure exceeding 500 kg/cm$^2$ no distinct effect of the pressure can be recognized. Thus, the upper limit of the pressure is specified to be 500 kg/cm$^2$.

Meanwhile, when the sintering temperature is lower than 1,400° C., densification of a ceramic composite cannot be accomplished. On the other hand, when the sintering temperature exceeds 1,850° C., MoSi$_2$ is reacted with impurities to be lowered in melting point while involving a bubbling phenomenon, thus failing in obtaining a dense sintered composite. When the sintering time is shorter than 10 minutes, densification of a ceramic composite cannot be accomplished. On the other hands since a sintering time exceeding 5 hours is impractical, the upper limit of the sintering time is specified to be 5 hours.

Example 1

Example 1 will now be specifically described.

An MoSi$_2$ powder of 99% in purity and 0.8 μm in average particle size was mixed with SiC whiskers of 0.5 μm in average diameter, 30 μm in average length and 85% in proportion [α/(α+β)] of the amount of α-crystals to the total amount of α-crystals and β-crystals in such a way that the amount of the former was 75 vol. % and the amount of the latter was 25 vol. %. The resulting mixed powder was subjected to wet mixing in a ball mill for 72 hours, and then dried. The resulting dried mixed powder was hot pressed in a stream of argon gas at 1,700° C. for 1 hour while applying thereto a pressure of 300 kg/cm$^2$ to obtain a 50 Φ×5 mm sintered disc.

3×4×40 mm test pieces and 1.5×4×25 mm test pieces were cut out from the disc thus obtained. A three-point bending test (span: 30 mm, crosshead speed: 0.5 mm/min) and a fracture toughness test (by the indentation method in accordance with the Niihara's formula) were carried out using the 3×4×40 mm test pieces, while four-point bending tests (upper span: 10 mm, lower span: 20 mm, crosshead speed: 0.03 mn/min) at room temperature at 1,000° C. and at 1,300° C. were carried out using the 1.5×4×25 mm: test pieces and a strain meter (lower limit of measurable strain: 0.1 μm) to draw respective load-displacement curves, from which respective displacements under a load of 5N and respective Young's modulus were found. The results are shown in Table 1.

TABLE 1

|  | Three-Point Bending Strength MPa | Fracture Toughness MPa √m | Displacement (load/5N) · μm | | | Young's modulus GPa | | |
| --- | --- | --- | --- | --- | --- | --- | --- | --- |
|  |  |  | R.T. | 1000° C. | 1300° C. | R.T. | 1000° C. | 1300° C. |
| MoSi$_2$/25SiCw | 670 | 4.8 | 2.0 | 2.8 | 6.3 | 338 | 196 | 104 |
| MoSi$_2$ | 240 | 1.7 | 2.1 | 3.9 | 13.5 | 290 | 146 | 38 |

The results of examination of strength, fracture toughness, displacement and Young's modulus for a sintered body hot pressed using only an MoSi$_2$ powder of 99% in purity and 0.8 μm in average particle size in the same manner as described above are also shown in Table 1. It is understood that the sintered composite according to the present invention had a strength about 2 times as high as that of the sintered body of MoSi$_2$ alone, as is apparent from Table 1. Additionally stated, a serpentine ceramic heating element according to the present invention was produced by grinding a 50 Φ×5 mm sintered disc produced in the same manner as described above, and forming the resulting thin plate material (thickness: e.g., 1 mm) into the desired shape by precision working such as wire electric discharge machining.

Figure 3:
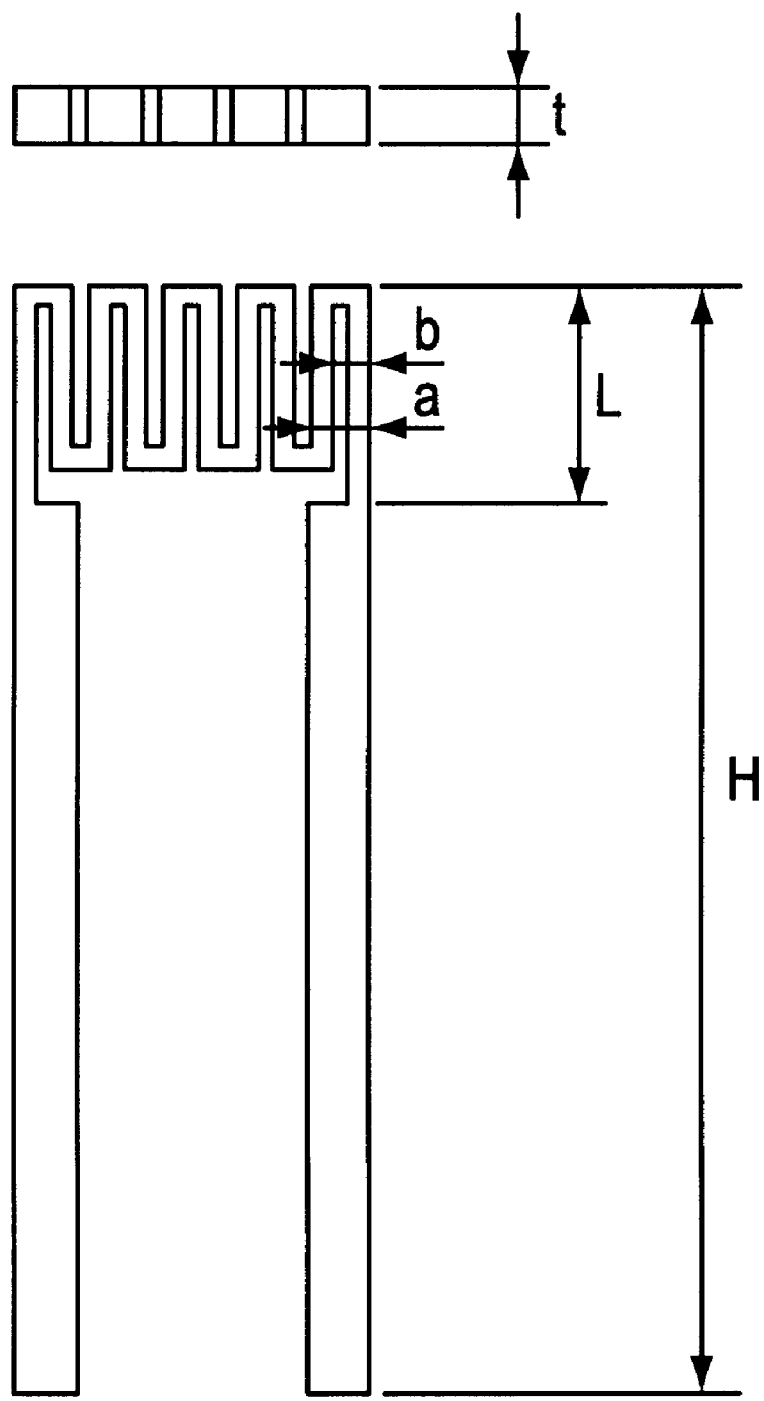
FIG. 3 is an explanatory diagram illustrating a specific example of the heating element of the present invention.

A specific example of the heating element is shown in FIG. 3.

As for the dimensions of the heating element, a=0.25 mm, b=0.3 mm, H=18 mm, L=3.5 mm, and t=0.3 mm. When this heating element is used for heat generation at 1,300° C., the electric power consumption thereof is 12 to 14 W. Since the disc material can be decreased in thickness and then formed into the miniature heating element, the heating element can have a high value of resistance and hence can be used as a small electric power consumption infrared ray source at a high temperature.

Further, since the material is a ceramic composite of $MoSi_2$ with whiskers not degrading the properties of $MoSi_2$, the heating element can be enhanced in mechanical strength and improved in deformation resistance without detriment to the properties of $MoSi_2$, including an excellent oxidation resistance and a capability of heat built-up to around 1,600° C. to provide a long-life infrared ray source.

Furthermore, since the ceramic composite material can be subjected to precision working such as electric discharge machining, a miniature heating element having a complicated shape can be easily produced therefrom.

In FIG. 2, silicon (Si) in the $MoSi_2$-SiC whisker ceramic composite as the material of the heating element is reacted with platinum (Pt) to form lead portions of platinum silicide when electrodes 2a and 2b provided on the heating element 1 are fusion-bonded to platinum wires. Since the melting point of platinum silicide is as very high as 1,000° C., the lead portions of the resistance heating element are advantageously very high in reliablity.

Example 2

In Example 2, a ceramic composite was produced in substantially the same manner as in Example 1 except the SiC whiskers that were used had an average diameter of 0.8 μm, an average length of 20 μm, and a β-crystal structure with an X-ray diffraction pattern having a peak at 2θ=33.6° but having no peak at 2θ=41.40°.

This ceramic composite was examined in the same manner as in Example 1 with respect to strength, fracture toughness, displacement and Young's modulus. The results are shown in Table 2.

Example 3

In Example 3, SiC whisker-reinforced ceramic composites having an $MoSi_2$-based matrix reinforced with particles dispersed therein were each produced using an MoB powder of 98% in purity and 1.2 μm in average-particle size or a WB powder of 99% in purity and 0.9 μm in average particle size in substantially the same manner as in Example 1. Herein, the amount of MoB or WE blended was 10 vol. % and the amount of SiC whiskers was 25 vol. %. Thus, the amount of $MoSi_2$ was 65 vol. %.

The ceramic composites were examined in the same manner as in Example 1 with respect to their properties i.e., strength, fracture toughness, displacement and Young's modulus. For comparison, $MoSi_2$-based ceramic composites reinforced with particles dispersed therein were each produced in substantially the same manner as described above except that no SiC whiskers were blended therein, and were then examined in the same manner as in Example 1. The results are shown in Table 3.

TABLE 3

| | | Three-Point Bending Strength | Fracture Toughness | Displacement (load/5N) · μm | | | Young's modulus GPa | | |
|---|---|---|---|---|---|---|---|---|---|
| | | MPa | MPa √√m | R.T. | 1000° C. | 1300° C. | R.T. | 1000° C. | 1300° C. |
| Ex. | $MoSi_2$/MoB/SiCw | 700 | 5.5 | 1.9 | 2.4 | 3.6 | 370 | 225 | 126 |
| | $MoSi_2$/WB/SiCw | 650 | 5.2 | 2.0 | 2.5 | 3.9 | 410 | 240 | 135 |
| Comp. | $MoSi_2$/MoB | 530 | 3.9 | 1.8 | 2.9 | 10.2 | 375 | 204 | 54 |
| Ex. | $Mosi_2$/WB | 490 | 3.5 | 2.1 | 3.1 | 9.5 | 403 | 210 | 69 |

Example 4

$MoSi_2$/MoB/SiC whisker ceramic composites were each produced in substantially the same manner as in Example 3 except that SiC whiskers having an average diameter as shown in Table 4 and a crystal form proportion as shown in Table 4 were blended in an amount as shown in Table 4. The ceramic composites thus obtained were each subjected to the same three point bending test and fracture toughness test as in Example 1.

TABLE 2

| | Three-Point Bending Strength | Fracture Toughness | Displacement (load/5N) · μm | | | Young's modulus GPa | | |
|---|---|---|---|---|---|---|---|---|
| | MPa | MPa √√m | R.T. | 1000° C. | 1300° C. | R.T. | 1000° C. | 1300° C. |
| $MoSi_2$/25SiCw | 590 | 4.5 | 1.8 | 3.0 | 5.8 | 356 | 310 | 114 |

TABLE 4

| | MoSi$_2$ Amount (vol. %) | MoB Amount (vol. %) | SiC whiskers Amount (vol. %) | SiC whiskers Average Diameter (μm) | α/(α + β) (%) | Three-Point Bending Strength MPa | Fracture Toughness MPa √m |
|---|---|---|---|---|---|---|---|
| Ex. | 60 | 10 | 10 | 0.5 | 85 | 584 | 5.1 |
| | 70 | 10 | 20 | 0.5 | 85 | 650 | 5.4 |
| | 60 | 10 | 30 | 0.5 | 85 | 720 | 5.8 |
| Comp. Ex. | 88 | 10 | 2 | 0.5 | 85 | 512 | 4.0 |
| | 45 | 10 | 45 | 0.5 | 85 | 550 | 6.0 |
| | 65 | 10 | 25 | 1.5 | 90 | 560 | 6.2 |
| | 65 | 10 | 25 | 0.6 | 0 | 620 | 4.6 |
| | 65 | 10 | 25 | 1.8 | 0 | 490 | 4.8 |
| | 65 | 10 | 25 | 0.4 | 30 | 605 | 4.2 |

Example 5

Further, ceramic composites (the same in composition as in Example 1) were each produced in substantially the same manner as in Example 1 except that the hot pressing conditions were varied. The ceramic composites thus obtained were each subjected to the same three-point bending test and fracture toughness test as in Example 1. The results are shown in Table 5.

TABLE 5

| | Pressure Sintering Temperature (°C.) | Pressure Sintering Pressrue (kg/cm$^2$) | Pressure Sintering Time (hr.) | Mechanical Properties Three-Point Bending Strength MPa | Mechanical Properties Fracture Toughness MPa √m |
|---|---|---|---|---|---|
| Ex. | 1450 | 450 | 1 | 595 | 4.9 |
| | 1600 | 200 | 1 | 650 | 5.1 |
| | 1800 | 450 | 1 | 686 | 4.7 |
| Comp. Ex. | 1350 | 450 | 1 | 220 | 1.5 |
| | 1900 | 450 | 1 | 137 | 1.1 |
| | 1700 | 450 | 0.05 | 380 | 3.9 |
| | 1700 | 450 | 6 | 574 | 4.8 |
| | 1700 | 30 | 1 | 290 | 3.4 |
| | 1700 | 600 | 1 | 699 | 5.0 |

Although the foregoing description has been made primarily with an infrared ray source in mind, the heating element of the present invention is not limited thereto and can be used, for example, as a heating element in an electric furnace as well. More specifically, an electric furnace usable in an oxidizing atmosphere must heretofore have been large-sized to some extent in association with the size of a heating element used therein, whereas an ultraminiature electric furnace can be produced using the ceramic heating element of the present invention.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A ceramic heating element comprising:
  a heat-generating portion constituted of a ceramic composite material and electrode portions provided on both ends of said heat-generating portion,
  wherein said ceramic composite material comprises 3 to 40 vol. % of SiC whiskers and the balance of a matrix substantially of MoSi$_2$, and
  wherein said SiC whiskers have an average diameter of 0.2 to 1.0 μm and an average length of 2 to 50 μm, and comprise at least 50% of SiC whiskers having an α-crystal structure or a β-crystal structure with stacking faults in the direction of growth thereof, i.e., a β-crystal structure with an X-ray diffraction pattern having a peak at 2θ=33.60° but having no peak at 2θ=41.4°.

2. The ceramic heating element as claimed in claim 1, wherein the matrix substantially of MoSi$_2$ is reinforced with a second phase or second and third phases dispersed therein and selected from the group consisting of Si$_3$N$_4$, TiC, ZrC, HfC, TiB, TiB$_2$, ZrB$_2$, HfB$_2$, ZrO$_2$, HfO$_2$, SiC, MoB, Mo$_2$B, Mo$_2$B$_5$, WB, W$_2$B, WB$_2$ and W$_2$B$_5$ phases.

3. The ceramic heating element as claimed in claim 2, wherein the amount of said second phase or the total amount of said second and third phases is at most 30 vol. % based on said matrix substantially of MoSi$_2$ reinforced with said second phase or said second and third phases dispersed therein.

4. The ceramic heating element as claimed in claim 2, wherein said second phase dispersed in said matrix reinforced therewith is an MoB or WB phase.

5. The ceramic heating element as claimed in claim 4, wherein the amount of said MoB or WB phase as said second phase dispersed in said matrix reinforced therewith is 10 vol. % based on the total amount of said matrix and said SiC whiskers and said second phase.

6. The ceramic heating element as claimed in claim 2, wherein said electrode portions on both ends of the heating element are also constituted of the ceramic composite material, and are fusion bonded to platinum wires.

7. The ceramic heating element as claimed in claim 1, wherein said SiC whiskers have an average diameter of 0.4 to 0.9 μm and an average length of 10 to 40 μm.

8. The ceramic heating element as claimed in claim 7, wherein the matrix substantially of $MoSi_2$ is reinforced with a second phase or second and third phases dispersed therein and selected from the group consisting of $Si_3N_4$, TiC, ZrC, HfC, TiB, $TiB_2$, $ZrB_2$, $HfB_2$, $ZrO_2$, $HfO_2$, SiC, MoB, $Mo_2B$, $Mo_2B_5$, WB, $W_2B$, $WB_2$ and $W_2B_5$ phases.

9. The ceramic heating element as claimed in claim 8, wherein the amount of said second phase or the total amount of said second and third phases is at most 30 vol. % based on said matrix substantially of $MoSi_2$ reinforced with said second phase or said second and third phases dispersed therein.

10. The ceramic heating element as claimed in claim 8, wherein said second phase dispersed in said matrix reinforced therewith is an MoB or WB phase.

11. The ceramic heating element as claimed in claim 10, wherein the amount of said MoB or WB phase as said second phase dispersed in said matrix reinforced therewith is 10 vol. % based on the total amount of said matrix and said SiC whiskers and said second phase.

12. The ceramic heating element as claimed in claim 8, wherein said electrode portions on both ends of the heating element are fusion bonded to platinum wires.

13. A ceramic heating element comprising:
    a heat-generating portion constituted of a ceramic composite material and electrode portions provided on both ends of said heat-generating portion,
    wherein said ceramic composite material comprises 3 to 40 vol. % of SiC whiskers and the balance of a matrix substantially of $MoSi_2$, and
    wherein said SiC whiskers comprise at least 80% of SiC whiskers having an α-crystal structure or a β-crystal structure with stacking faults in the direction of growth thereof, i.e., a β-crystal structure with an X-ray diffraction pattern having a peak at 2θ=33.6° but having no peak at 2θ=41.4°.

14. The ceramic heating element as claimed in claim 13, wherein the matrix substantially of $MoSi_2$ is reinforced with a second phase or second and third phases dispersed therein and selected from the group consisting of $Si_3N_4$, TiC, ZrC, HfC, TiB, $TiB_2$, $ZrB_2$, $HfB_2$, $ZrO_2$, $HfO_2$, SiC, MoB, $Mo_2B$, $Mo_2B_5$, WB, $W_2B$, $WB_2$ and $W_2B_5$ phases.

15. The ceramic heating element as claimed in claim 14, wherein the amount of said second phase or the total amount of said second and third phases is at most 30 vol. % based on said matrix substantially of $MoSi_2$ reinforced with said second phase or said second and third phases dispersed therein.

16. The ceramic heating element as claimed in claim 14, wherein said second phase dispersed in said matrix reinforced therewith is an MoB or WB phase.

17. The ceramic heating element as claimed in claim 16, wherein the amount of said MoB or WB phase as said second phase dispersed in said matrix reinforced therewith is 10 vol. % based on the total amount of said matrix and said SiC whiskers and said second phase.

18. The ceramic heating element as claimed in claim 14, wherein said electrode portions on both ends of the heating element are also constituted of the ceramic composite material, and are fusion bonded to platinum wires.

19. The ceramic heating element as claimed in claim 1, wherein said electrode portions convey electrical power to said heat-generating portion for resistive heating thereof.

20. The ceramic heating element as claimed in claim 13, wherein said SiC whiskers have an average diameter of about 0.6 to 1.0 μm and an average length of about 60 to 50 μm.

21. A ceramic heating element, comprising:
    a body of a ceramic composite material having a heat-generating portion and electrode portion provided on both ends of said heat-generating portion; and
    platinum wires that are fusion bonded to the electrode portions of the body of ceramic composite material,
    wherein said ceramic composite material 3 to 40 vol. % of SiC whiskers and the balance of a matrix substantially of $MoSi_2$, and
    wherein said SiC whiskers comprise at least 50% of SiC whiskers having an α-crystal structure or a β-crystal structure with stacking faults in the direction of growth thereof, i.e., a β-crystal structure with an X-ray diffraction pattern having a peak at 2θ=33.6° but having no peak at 2θ=41.4°.

22. The ceramic heating element as claimed in claim 21, wherein the body of ceramic composite material is generally flat, wherein the heat-generating portion comprises a plurality of segments disposed in a serpentine configuration, the segments having a segment width, and wherein the electrode portions have widths that are substantially larger than the segment width.

23. The ceramic heating element as claimed in claim 21, wherein said SiC whiskers have an average diameter of 0.2 to 1.0 μm and an average length of 2 to 50 μm.

24. The ceramic heating element as claimed in claim 23, wherein the matrix substantially of $MoSi_2$ is reinforced with a second phase or second and third phases dispersed therein and selected from the group consisting of $Si_3N_4$, TiC, ZrC, HfC, TiB, $TiB_2$, $ZrB_2$, $HfB_2$, $ZrO_2$, $HfO_2$, SiC, MoB, $Mo_2B$, $Mo_2B_5$, WB, $W_2B$, $WB_2$ and $W_2B_5$ phases.

25. The ceramic heating element as claimed in claim 24, wherein the amount of said second phase or the total amount of said second and third phases is at most 30 vol. % based on said matrix substantially of $MoSi_2$ reinforced with said second phase or said second and third phases dispersed therein.

26. The ceramic heating element as claimed in claim 24, wherein said second phase dispersed in said matrix reinforced therewith is an MoB or WB phase.

27. The ceramic heating element as claimed in claim 26, wherein the amount of said MoB or WB phase as said second phased dispersed in said matrix reinforced therewith is 10 vol. % based on the total amount of said matrix and said SiC whiskers and said second phase.

28. The ceramic heating element as claimed in claim 1, wherein said heat-generating portion of said ceramic heating element is integrally connected to said electrode portions and is self-supporting between said electrode portions.

29. The ceramic heating element as claimed in claim 13, wherein said heat-generating portion of said ceramic heating element is integrally connected to said electrode portions and is self-supporting between said electrode portions.

30. The ceramic heating element as claimed in claim 21, wherein said heat-generating portion of said body is integrally connected to said end portions and is self-supporting between said end portions.

* * * * *